(12) United States Patent
Leu et al.

(10) Patent No.: US 7,237,223 B2
(45) Date of Patent: Jun. 26, 2007

(54) APPARATUS AND METHOD FOR REAL-TIME CAUTION AND WARNING AND SYSTEM HEALTH MANAGEMENT

(75) Inventors: Jenson H. Leu, Huntington Beach, CA (US); Robert Wang, Irvine, CA (US); Shahram Rahmani, Irvine, CA (US)

(73) Assignee: The Boeing Company, Chicago, IL (US)

( * ) Notice: Subject to any disclaimer, the term of this patent is extended or adjusted under 35 U.S.C. 154(b) by 837 days.

(21) Appl. No.: 10/411,705

(22) Filed: Apr. 11, 2003

(65) Prior Publication Data

US 2004/0205700 A1 Oct. 14, 2004

(51) Int. Cl.
*G06F 9/44* (2006.01)
(52) U.S. Cl. ...................................... 717/106
(58) Field of Classification Search ................ 717/138, 717/146, 106–108
See application file for complete search history.

(56) References Cited

U.S. PATENT DOCUMENTS

| | | | |
|---|---|---|---|
| 4,231,087 A * | 10/1980 | Hunsberger et al. ........... 714/25 |
| 5,659,554 A * | 8/1997 | Okayasu ..................... 714/738 |
| 5,842,020 A * | 11/1998 | Faustini ...................... 717/111 |
| 6,002,869 A * | 12/1999 | Hinckley ..................... 717/124 |
| 2004/0205699 A1* | 10/2004 | Keim et al. ................. 717/106 |
| 2004/0205713 A1* | 10/2004 | Keim et al. ................. 717/118 |

* cited by examiner

*Primary Examiner*—Wei Zhen
*Assistant Examiner*—Philip Wang
(74) *Attorney, Agent, or Firm*—Lee & Hayes, PLLC (57) ABSTRACT

Methods and systems consistent with the present invention include developing a real-time caution and warning (CW) and system health management (HM) software, having an architecture that partitions the application software into two major components: a) a Bytecode, which is an organized collection of CW and/or HM data objects that defines the components and attributes of that particular application function within the given system, and b) a software entity, called the Virtual Engine (VE), which is executed within an embedded system, which takes as its input the "Bytecode" that it manipulates according to a predefined instruction set. The system user or designer can define, design, test, and validate the system using a user-friendly tool. The VE is intended to be reusable within the CW and system HM application domain.

116 Claims, 2 Drawing Sheets

APPARATUS AND METHOD FOR REAL-TIME CAUTION AND WARNING AND SYSTEM HEALTH MANAGEMENT

The present invention relates generally to an apparatus and method for developing a real-time caution and warning system health management software product.

BACKGROUND OF THE INVENTION

Every year, billions of dollars are spent under government and commercial projects to develop application software for the caution warning (CW) and system health management (HM) of embedded systems, including those used for transportation systems, defense systems, communication systems, automation systems, control systems, "smart" systems, etc. In nearly all cases, the application software (that is, the code) currently used in the industry, is developed and generated from scratch and/or generated via autocode generators.

For example, traditional processes for the development of caution warning (CW) and system health management (HM) software systems are based on "hand coding" using common available programming languages (such as Ada and C). The manual hand coding process is time consuming and costly. More advanced approaches use "automatic code generation" to improve the process. However, this newer process still requires lengthy steps such as "code compilation", "linking" and "software loading" every time CW or HM objects are generated or modified.

Reuse of application software is only considered cost effective if the new embedded system is very similar to the previously developed system (such as flight management application software used in airplanes). Even in such cases, many "reuse" attempts fail to be cost effective due to hidden dependencies and unique attributes that make such application software products incompatible.

Thus, an innovative solution for improving the productivity of generating CW and HM software (used for near-real-time vehicle health diagnostics and prognostics) beyond automatic code generation by eliminating the need for "code compilation", "linking" and "software load generation", and to eliminate the need for software developers to define, design, and code the associated software, as well as eliminate the need for code certification of new or modified software, is needed.

SUMMARY OF THE INVENTION

In one aspect of the present invention, a method of creating a predetermined application includes: receiving an input of user-defined data objects and attributes of said data objects into a database; formatting said data objects and generating a Bytecode that defines components and attributes of the application; interpreting said Bytecode using simulated data and subsystems information; and at least one of outputting and displaying attributes that drive one of a simulated output device and display.

In another aspect of the present invention, a method of creating a predetermined application includes: receiving an input of user-defined data objects and attributes of said data objects; storing said data objects and attributes in a database; formatting said data objects and generating a Bytecode that defines components and attributes of the predetermined application; interpreting said Bytecode using a Virtual Engine with simulated data and subsystems information; at least one of outputting and displaying attributes that drive one of a simulated output device and display; receiving a determination of a validity of a design of the predetermined application based on said one of outputted and displayed attributes, and when said design is valid: receiving said Bytecode at a target data processing system; receiving real-time data and subsystems information into a target Virtual Engine; interpreting said Bytecode using said target Virtual Engine; and at least one of outputting and displaying attributes that drive a target actual one of an output device and display.

In yet another aspect of the present invention, a method of creating a caution warning (CW) and system health management (HM) application includes: receiving an input of user-defined data objects and attributes of said data objects; storing said data objects and attributes in a database; invoking an object compiler to obtain an intermediate representation of said data objects; formatting said data objects and generating a Bytecode that defines components and attributes of the predetermined application; interpreting said Bytecode using a Virtual Engine with simulated sensor data and subsystems health information; at least one of outputting and displaying attributes that drive one of a simulated output device and display; receiving a determination of a validity of a design of the predetermined application based on said one of outputted and displayed attributes, and when said design is valid: receiving said Bytecode at a target data processing system; receiving real-time sensor data and subsystems health information into a target Virtual Engine; interpreting said Bytecode using said target Virtual Engine; and at least one of outputting and displaying attributes that drive a target real-time one of an output device and display.

In yet another aspect of the present invention, a system for creating a predetermined application includes: means for receiving an input of user-defined data objects and attributes of said data objects into a database; means for formatting said data objects and generating a Bytecode that defines components and attributes of the application; means for interpreting said Bytecode using simulated data and subsystems information; and means for one of outputting and displaying attributes that drive a simulated one of an output device and display.

In yet another aspect of the present invention, a system for creating a predetermined application includes: means for receiving a Bytecode into a data processing system; means for receiving data and subsystems information into a Virtual Engine; means for interpreting said Bytecode using said Virtual Engine; and means for one of outputting and displaying attributes that drive one of an output device and display.

In yet another aspect of the present invention, a system for creating a predetermined application includes: means for receiving an input of user-defined data objects and attributes of said data objects; means for storing said data objects and attributes in a database; means for formatting said data objects and generating a Bytecode that defines components and attributes of the predetermined application; means for interpreting said Bytecode using a Virtual Engine with simulated data and subsystems information; means for one of outputting and displaying attributes that drive a simulated one of an output device and display; means for receiving a determination of a validity of a design of the predetermined application; means for receiving said Bytecode at a target data processing system; means for receiving real-time data and subsystems information into a target Virtual Engine; means for interpreting said Bytecode using said target Virtual Engine; and means for one of outputting and displaying attributes that drive a target actual one of an output device and display.

In yet another aspect of the present invention, a method of creating a caution warning (CW) and system health management (HM) application includes: means for receiving an input of user-defined data objects and attributes of said data objects; means for storing said data objects and attributes in a database; means for invoking a compiler to obtain an intermediate representation of said data objects; means for formatting said data objects and generating a Bytecode that defines components and attributes of the predetermined application; means for interpreting said Bytecode using a Virtual Engine with simulated sensor data and subsystems health information; means for one of outputting and displaying attributes that drive a simulated one of an output device and display; means for receiving a determination of a validity of a design of the predetermined application; means for receiving said Bytecode at a target data processing system; means for receiving real-time sensor data and subsystems health information into a target Virtual Engine; means for interpreting said Bytecode using said target Virtual Engine; and means for one of outputting and displaying attributes that drive a target real-time one of an output device and display.

In yet another aspect of the present invention, an apparatus for creating a predetermined application includes: a human machine interface (HMI) which creates user-defined data objects and attributes of said data objects specific to the application; a formatter which formats said data objects and said attributes into a Bytecode; and an I/O Simulation which provides simulated data and subsystems information to a Virtual Engine which interprets said Bytecode to produce a predetermined functionality and products intended for the application.

In yet another aspect of the present invention, a method of creating a predetermined application includes: receiving a Bytecode at a data processing system; receiving data and subsystems information into a Virtual Engine; interpreting said Bytecode using said Virtual Engine; and at least one of outputting and displaying attributes that drive one of an output device and display.

In yet another aspect of the present invention, there is a computer-readable medium having contents that cause a computer system to create a predetermined application, the computer system having a program that performs the steps of: receiving an input of user-defined data objects and attributes of said data objects into a database; formatting said data objects and generating a Bytecode that defines components and attributes of the predetermined application; interpreting said Bytecode using simulated sensor data and subsystems health information; and at least one of outputting and displaying attributes that drive a simulated one of output device and display.

In yet another aspect of the present invention, there is a computer-readable medium having contents that cause a computer system to create a predetermined application, the computer system having a program that performs the steps of: receiving an input of user-defined data objects and attributes of said data objects; storing said data objects and attributes in a database; formatting said data objects and generating a Bytecode that defines components and attributes of the application; interpreting said Bytecode using a Virtual Engine with simulated data and subsystems information; at least one of outputting and displaying attributes that drive a simulated one of output device and display; receiving a determination of a validity of a design of the predetermined application based on said one of outputted and displayed attributes, and when said design is valid: receiving said Bytecode at a target data processing system; receiving real-time data and subsystems information into a target Virtual Engine; interpreting said Bytecode using said target Virtual Engine; and at least one of outputting and displaying attributes that drive a target actual one of output device and display.

In yet another aspect of the present invention, there is a computer-readable medium having contents that cause a computer system to create a caution warning (CW) and system health management (HM) application, the computer system having a program that performs the steps of: receiving an input of user-defined data objects and attributes of said data objects; storing said data objects and attributes in a database; invoking an object compiler to obtain an intermediate representation of said data objects; formatting said data objects and generating a Bytecode that defines components and attributes of the predetermined application; interpreting said Bytecode using a Virtual Engine with simulated sensor data and subsystems health information; at least one of outputting and displaying attributes that drive a simulated one of output device and display; receiving a determination of whether a design of the application is valid, and when said design is valid: receiving said Bytecode at a target data processing system; receiving real-time sensor data and subsystems health information into a target Virtual Engine; interpreting said Bytecode using said target Virtual Engine; and at least one of outputting and displaying attributes that drive a target real-time one of output device and display.

In yet another aspect of the present invention, there is a computer-readable medium having contents that cause a computer system to create a predetermined application, the computer system having a program that performs the steps of: receiving a Bytecode at a data processing system; receiving data and subsystems information into a Virtual Engine; interpreting said Bytecode using said Virtual Engine; and at least one of outputting and displaying attributes that drive one of an output device and display.

In yet another aspect of the present invention a computer system for creating a predetermined application, the computer system includes: a memory including: at least one program for receiving an input of user-defined data objects and attributes of said data objects into a database; formatting said data objects and generating a Bytecode that defines components and attributes of the application; interpreting said Bytecode using simulated sensor data and subsystems health information; and at least one of outputting and displaying attributes that drive a simulated one of output device and display; and a processor for running said at least one program.

In yet another aspect of the present invention, a computer system for creating a predetermined application, the computer system including: a memory including: at least one program for receiving a Bytecode to a data processing system; receiving data and subsystems information into a Virtual Engine; interpreting said Bytecode using said Virtual Engine; and at least one of outputting and displaying attributes that drive one of an output device and display; and a processor for running said at least one program.

In yet another aspect of the present invention, a computer system for creating a predetermined application, the computer system includes: a memory including: at least one program for receiving an input of user-defined data objects and attributes of said data objects; storing said data objects and attributes in a database; formatting said data objects and generating a Bytecode that defines components and attributes of the application; interpreting said Bytecode using a Virtual Engine with simulated data and subsystems information; at least one of outputting and displaying attributes that drive a simulated one of output device and display; receiving a determination of whether a design of the application is valid, and when said design is valid: receiving said Bytecode at a target data processing system; receiving real-time data and information into a target Virtual Engine; interpreting said Bytecode using said target Virtual Engine; and at least one of outputting and displaying attributes that drive a target actual one of output device and display; and a processor for running said at least one program.

In a final aspect of the present invention, a computer system for creating a caution warning (CW) and system health management (HM) application, the computer system includes: a memory including: at least one program for receiving an input of user-defined data objects and attributes of said data objects; storing said data objects and attributes in a database; invoking an object compiler to obtain an intermediate representation of said data objects; formatting said data objects and generating a Bytecode that defines components and attributes of the application; interpreting said Bytecode using a Virtual Engine with simulated sensor data and subsystems health information; at least one of outputting and displaying attributes that drive a simulated one of output device and display; receiving a determination of whether a design of the application is valid, and when said design is valid: receiving said Bytecode at a target data processing system; receiving real-time sensor data and subsystems health information into a target Virtual Engine; interpreting said downloaded Bytecode using said target Virtual Engine; and at least one of outputting and displaying attributes that drive a target real-time one of output and display; and a processor for running said at least one program.

There has thus been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatus consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for designing other structures, methods and systems for carrying out the several purposes of the present invention. It is important, therefore, that the claims be regarded as including such equivalent constructions insofar as they do not depart from the spirit and scope of the methods and apparatuses consistent with the present invention.

DETAILED DESCRIPTION OF THE INVENTION

In one embodiment, methods and systems consistent with the present invention include developing a real-time caution and warning (CW) and system health management (HM) software including diagnostic and system health monitoring software products.

In particular, methods and systems consistent with the present invention include a real-time caution and warning and system health management software having an architecture that partitions the application software into two major components:

a) a Bytecode (data), which is an organized collection of CW and/or HM data objects (non-code—with both static and dynamic attributes) that defines the components and attributes of that particular application function within the given system. The system user or designer can define, design, test, and validate the system using a user-friendly tool.

b) a software entity, called the Virtual Engine (VE) (code), which is executed within an embedded system. The VE takes as its input the "Bytecode" that it manipulates (interprets) according to a predefined instruction set. The VE is domain specific (that is, for each software application domain, a distinct VE is needed), and the VE is intended to be reusable within the CW-HM application domain. The data objects are defined such that they define all system unique (and customized) features and characteristics and are understandable by the corresponding VE.

Thus, methods and systems consistent with the present invention include an architecture (supported by a set of user tools) that minimizes the need for software programming, allowing a system user or designer to define the data objects for the user's unique system, integrate them with the reusable VE, and generate the customized application software.

Thus, once the VE consistent with the present invention is in place, software production for a real-time CW and system HM application would be reduced to 1) design of system configuration (i.e., selection of desired objects and their attributes), and 2) verification of configuration object files processed by the VE.

Accordingly, the architecture consistent with the present invention allows handling of dynamic objects and their attributes, and makes the data objects and the VE building blocks of a larger integrated system, allowing data objects to be driven by external events (such as a user command) or change based on a timing profile (such as cyclic updates). This dynamic capability is very much required in embedded systems.

Accordingly, with the present invention, software integration is reduced and software maintenance cost is reduced. Engine interface is simple for ease of integration (all functions are handled via less than a half dozen commands). Software design changes are primarily accomplished via changes to configuration objects—there are no VE code changes, thereby reducing software integration and maintenance cost.

The various elements which make up the CW and system HM application consistent with the present invention will now be described.

Figure 1:
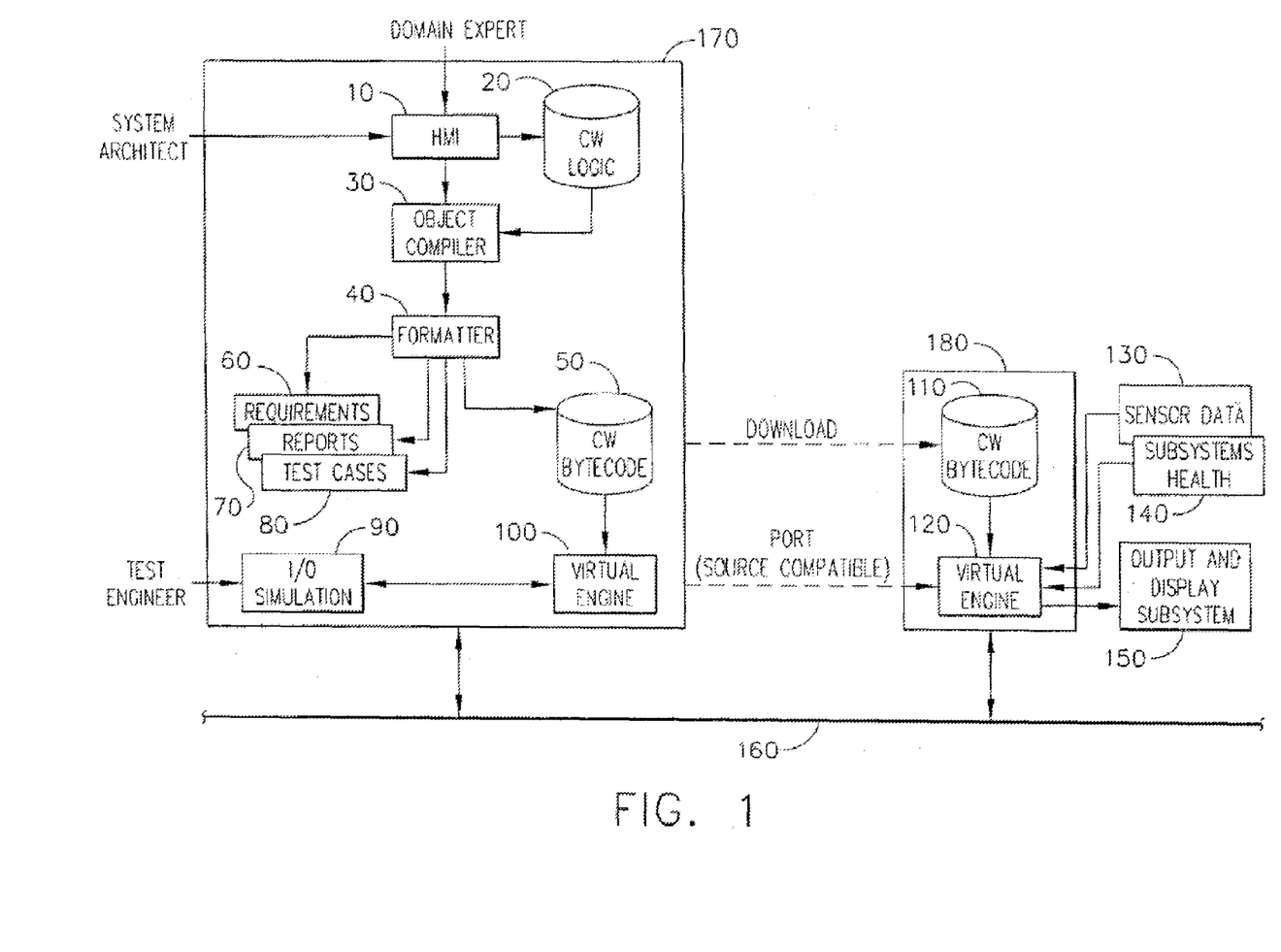
FIG. 1 is a diagram showing an overview of one embodiment of the architecture consistent with the methods and systems of the present invention.

FIG. 1 discloses a control and dataflow that emphasizes aspects of the VE that would fit in a typical software engineering process.

Note that the functions depicted in the Design/Development and Validation Environment 170 and the Target System 180 of FIG. 1, take place in a data processing system and are depicted as being stored in memory. However, one skilled in the art will appreciate that all or part of systems and methods consistent with the present invention may be stored on or read from other computer-readable media, such as secondary storage devices, like hard disks, floppy disks, and CD-ROM, a carrier wave received from a network such as the Internet, or other forms of ROM or RAM either currently known or later developed.

As shown in FIG. 1, in the Design/Development and Validation Environment 170 consistent with the present invention, there is a set of support tools, shown as the Human-Machine Interface (HMI) 10, which is used to capture domain knowledge from system architects and domain experts. On desktop platforms, the HMI 10 assumes the familiar graphical user interface, which runs in memory on a data processing system such as a personal computer (PC). However, the HMI 10 can also be web-based in order to reach a broader realm of experts.

The HMI 10 allows various end-users and system analysts to design and validate the CW and HM algorithms, behavior, and software, as well as their execution on both host and target. In particular, the HMI 10 is provided for the user or system designer to define the software objects and data (that is, the system and domain specific data) using menu-driven concepts which the user can easily manipulate. The user can create object definition files, save, load, and edit object definition files utilizing the HMI 10.

With respect to the data objects, each object maintains a static copy of its original attribute data, a dynamic copy, and storage for computational data, and reference to any unique error handling. The data objects are required to be defined in a specific format and syntax, and can be defined as either static or dynamic objects. Each of the objects can have a number of both static and dynamic attributes that further define the object and are defined by the user.

Through the HMI 10, the domain expert knowledge is captured in a human-machine-readable form and is stored in an on-host (e.g., PC) database 20 (or at a remote server) for further processing. This database 20 is called the "CW Logic" 20 and uses a domain-specific syntax defined for each kind of database record. The HMI 10 can be configured to interface with different kinds of databases 20 using their respective drivers. The content of the database 20 can be reviewed and modified by the user.

The HMI 10 provides access to other elements of the system such as an object compiler 30. The object compiler 30 can be embedded within the HMI 10, or can be a separate tool that can be used by the user in association with the HMI 10. In either case, the object compiler 30 resides and is executed on the host or PC. The object compiler 30 associates objects and their attributes with memory addresses from a user-supplied "load map" (list that specifies the source of external inputs or outputs for an application). Each attribute may be manipulated by direct target memory reference or through more complex mechanisms. For example, a warning message may change when a value at a referenced target memory location reaches a particular value. The user can access and analyze/correct errors generated by the object compiler 30. The object compiler 30 maintains a master list of all objects and attributes.

Thus, the HMI 10 converts the visual representation and object definitions created by the user to a scripting language and submits this script to the object compiler 30. Scripting is used to access target memory and for modifying or manipulating each object attribute by direct target memory reference or through more complex mechanisms. For example, scripts are used to change the criticality of a warning message (that is, an object) when the value at a referenced target memory location reaches a certain limit. This is considered consistent usage.

Scripting is simple by design and the scripts are comprised of distinct "sections" that include lexical and syntax information. Examples of sections are: static text, and dynamic graphical objects.

The scripts are processed by the object compiler 30 for syntax checking and semantic analysis. In that case, the compiler 30 is invoked on the CW Logic 20 database upon command by the HMI 10. The result is an intermediate form of representation (IR), which is a transformed version of the original database, but is more suitable for ensuing processing by the Formatter 40.

The Formatter 40, taking as its input the IR, performs further analysis on the IR and generates the "CW Bytecode" 50, which is a context free, optimized set of low level primitive instructions for receipt by the VE 100 (e.g., a binary compilation of the database logic that is understood by the domain-specific VE 100).

The CW Bytecode 50 includes an organized set of information on the static and dynamic data elements that define the components and the attributes of the application function within the given system. The format, syntax, and semantics of the CW Bytecode 50 are part of its interface with the VE 100 that must be defined thoroughly and optimally to maximize the execution performance of application software. Thus, the CW Bytecode 50 provides all the information needed by the VE 100 to produce the desired functionality and products intended for the application software.

To elaborate, the VE 100 itself is a compilation of the underlying machine instructions (hence code). In contrast, the CW Bytecode 50 is a compilation of the "instructions" for the VE 100. The underlying computing machine (i.e., computer) never executes the CW Bytecode 50 directly. Hence the CW Bytecode 50 is treated by the computer as data. Since the CW Bytecode 50 is a compilation of "instructions" for the VE 100, it is interpreted by the VE 100 and thus, protected by the VE 100 runtime environment (fault-tolerant).

In addition to generating the CW Bytecode 50, as byproducts, the Formatter 40 also generates system Requirements 60, database statistical Reports 70, and Test Cases (vectors) 80 for the CW logic based on the IR.

Requirements 60 are generated by the Formatter 40 using a domain-specific template, and contain system-level requirements that would normally be written by system engineers. This document can be generated in the desired format, such as a word processing system like Microsoft Word™, HTML, or XML, and is selectable by the user.

Reports 70 identify relationships among system variables in the CW Logic database 20 such as "uses", "used by", and "dead code". Reports 70 help system architects to better design the CW Logic database 20 in an incremental fashion and to eliminate errors in the CW Logic database 20 early in the database design.

The Reports 70 generator can generate a difference report between the current version and the updated version to identify system variables in said CW Logic database 20 in which corrections/enhancements were made. A dependency report can then be generated on all the changed objects. This report identifies in detail exactly what the corrections/enhancements impacted in the overall design. Test Cases 80 can now be automatically generated against the impacted objects only.

Test Cases 80 consist of sets of test vectors that are generated by the Formatter 40 to cover, for example, all possible branches in the CW Bytecode 50. These, in combination with simulated Input/Output (I/O) 90, can be used to drive the VE 100 for design validation checks even before the target environment is defined. The generated test scripts processed by the object compiler 30 can be run automatically, which in turn allows the Formatter 40 to automatically generate the Test Cases 80.

I/O Simulation 90 represents on-host simulated sensor data, subsystems health information, and display of caution and warning conditions and alerts. In particular, examples of inputs are: signal ID, signal type range including enumerated types; internal vs. external signals items; signal values which can be driven by data from simulation and/or other applications/sources; automatic signal threshold selection based on modes of operations. Examples of outputs are: definition of outputs; emergency, warning, caution, advisory messages and driver action text; links with other application objects; auto-clear feature for all outputs; and capability for display priority attributes.

At the requirements development phase, it is more convenient to validate the design in the host environment where the tool (e.g., HMI 10) resides. In addition, without interfacing to the target, it results in a shorter turnaround time for design corrections. Of course, resource and timing analysis must be performed in the target environment, and that is what the Requirements Verification Phase is for. The CW Logic database 20 defines a set of variables that can be "connected" to the on-host simulator, hardware-in-the-loop (HWIL) simulators, or actual operational devices.

As stated above, the VE 100, with simulated sensor data and subsystems health information from the I/O Simulation 90, processes (interprets) the CW Bytecode 50 to generate the attributes that drive the simulated application operational environment. The process is usually initiated by a project team member assuming the role of test engineer. Test vectors generated by the test engineer and/or those contained within the Test Cases 80 are supplied to the on-host I/O Simulator 90 to facilitate the validation process in a simulated operational environment.

Thus, the VE 100 interprets object information based on a set of application specific rules, and the static and dynamic attributes of the objects. The VE 100 reads addresses from object definitions for objects and attributes linked to external variables, and performs logical and arithmetic operations on objects/attributes. Example algorithms include: arithmetic expressions; logic expressions and latching (set/reset or hold); time delays on signals or logic expressions; threshold values, default values; previous value/state and current value/state; selectable signal range checking; automatic signal default value assignment; input signal override of value or status; description field for auto document generation (algorithms and signal/data).

The VE 100 performs cyclic computational updates based upon user inputs and object attributes. The VE 100 manages changes to the dynamic attributes of the objects and updates the attributes. However, objects are only updated when their associated data change. Thus, the VE 100 is fully deterministic and verifiable.

The VE 100 encapsulates (separates, hides, not visible to or shared across data objects) each object and as a result, localizes possible computational and interpretation errors. Thus, a problem associated with interpreting an object cannot corrupt the interpretation of any other object.

Further, the VE 100 interprets the object compiler generated CW Bytecode 50 in VE 100 primitive execution units (of objects). Each object is "selected" for interpretation based upon object internal criteria (derived from end-user inputs). Objects without criteria (e.g., no target memory references) are interpreted once and are skipped thereafter. Other objects are interpreted based upon a change in their referenced target memory values and/or because a timing event has occurred (for example, a cyclic execution rate). Interpreted objects may result in a data transfer to external elements. If objects contain scripts, then the VE 100 passes control to such scripts and the scripts execute not in target machine code units, but in VE primitive execution units. VE primitive execution units are designed to operate as a stack-based machine. Execution allows standard mathematical operators, logical operators, comparison operators, conditional branch operators, and target memory referencing operators.

The VE 100 does not contain any tasking capabilities, memory management capabilities or hardware specific interfaces with external devices. The target machine environment executes the VE 100 at a rate designed for the application domain. The VE 100 assumes a simple rate monolithic scheduler, but could also be designed for use with a more complex scheduler (foreground/background).

Once the VE 100 interprets the CW Bytecode 50 and provides the attributes that drive the simulated system behavior, the system architects can validate their design by generating conditions and alerts on the system outputs against their design goals to determine if the system is behaving how the system architects want. If design goals are met, the process is moved to the Requirements Verification phase. Otherwise, the CW Logic 20 is modified and the process repeated.

In the Requirements and Verification Phase, resource and timing analysis must be performed in the Target System 180. In a lab setting or during initial image "burn" for standalone operations, a communication link 160 is set up between the host and the target. This is usually a serial or an Ethernet interface. The application tool (e.g., HMI 10) has a target-resident agent (target server) to facilitate downloading of the CW Bytecode 50 from the host over this interface. The CW Bytecode 110 downloaded is a verbatim copy of the one on the host. This would not be possible in the conventional approach where the CW Logic 20 has to be recoded, debugged, and then downloaded, an error-prone and time consuming process.

The VE 120, on the other hand, has to be ported to the target environment. Since the size of the VE 120 is small and most of its logic is domain-specific, with careful design and selection of APIs, the target-dependent part of the VE code can be minimized, and porting amounts to a mere recompilation of the VE code (source-level compatible). Nevertheless, this is a one-time "not recurring" cost incurred during the process. The target VE 120, with actual (real-time) and/or Hardware-in-the-Loop (HWIL)-simulated Sensor Data 130 and Subsystems Health information 140, which represents real-time and/or HWIL-simulated subsystems (health information), interprets the CW Bytecode 110 to generate the application behavior attributes that drive the actual output devices, such as the Display Subsystem 150 unit (typically a multi-functional display unit (MDU)). Test vectors generated by test engineers and/or those contained within the Test Cases 80 are supplied to the target environment to facilitate the verification process.

System architects verify their design by generating conditions and alerts on the display against their design goals to determine if the system is behaving in the way it is expected. If requirements are satisfied, the design is accepted, and the system is ready for deployment. Otherwise, the CW Logic 20 is modified and the process is repeated.

Figure 2:
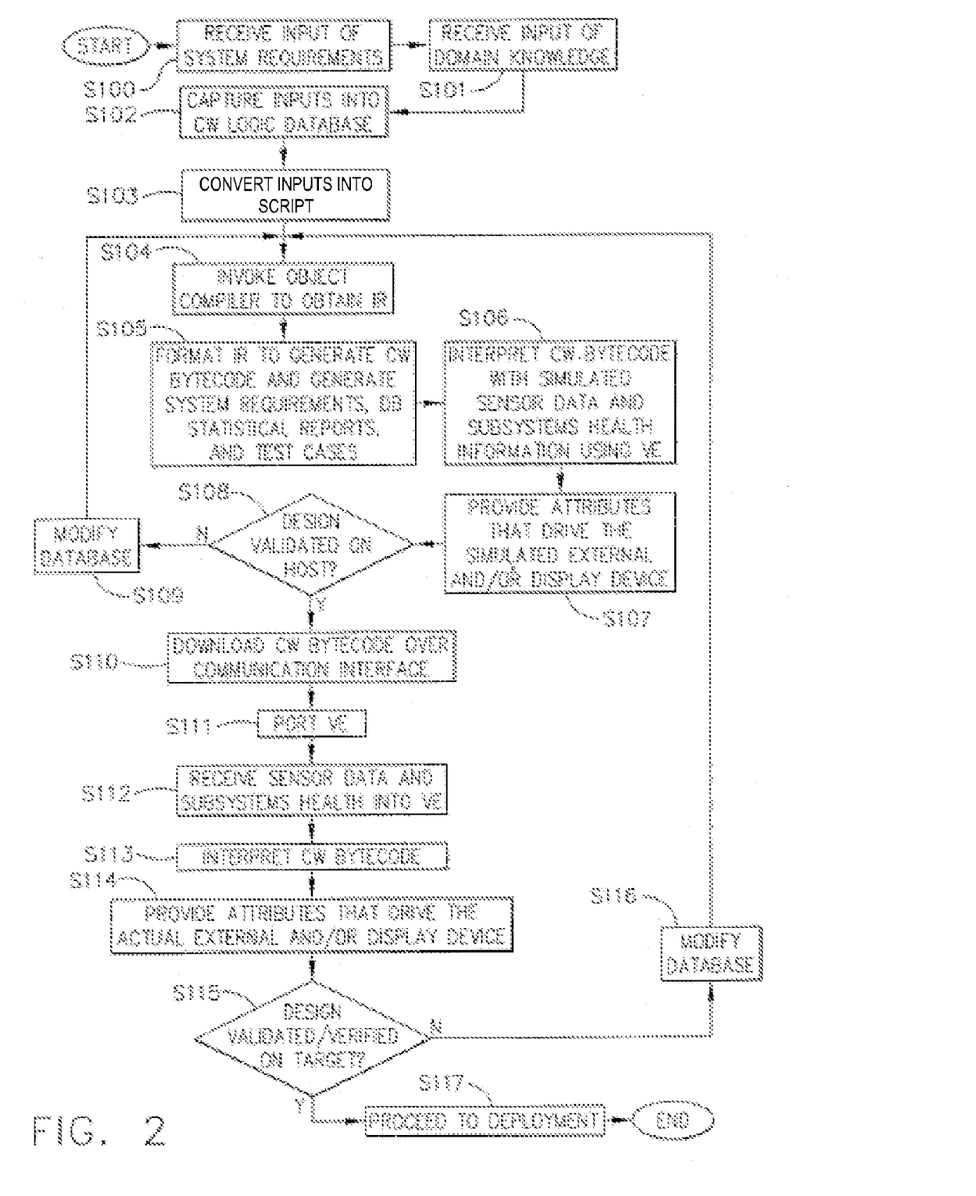
FIG. 2 is a flowchart showing the major steps in one embodiment of the architecture consistent with the methods and systems of the present invention.

With respect to FIG. 2, the process flow for the use of VE application definition and execution with respect to the CW and system HM application is described.

In the Design/Development and Validation Environment 170 of FIG. 1, input step S100 is System Requirements, which are received by the CW and system HM application program from the system architects.

In step S101, the application program receives input of Domain Knowledge from the domain experts.

In step S102, the HMI 10 captures these inputs into an on-host database via a suitable user interface. The inputted information is deposited into CW Logic database 20 (see FIG. 1) and contains a human/machine-readable form of records that conform to a domain-specific syntax.

In step S103, the HMI 10 converts the inputted information, which is deposited in CW logic 20, into a scripting language.

Thus, in step S104, the program then invokes the object compiler 30 on the CW Logic database 20 for syntax checking and semantical analysis. The result, an intermediate form of representation (IR), is a transformed version of the original database, but is more suitable for ensuing processing by the Formatter 40.

In step S105, the Formatter 40, taking as its input the IR, performs further analysis on the IR and generates the CW Bytecode 50. As byproducts, the Formatter 40 also generates system requirements, database statistical reports, and test vectors for the CW Logic based on the IR.

In step S106, the CW Bytecode, a compilation of "instructions" for the VE 100, is interpreted by the VE 100 using simulated sensor data and subsystems health information from the I/O Simulator 90.

In step S107, external device and display attributes that drive the simulated external device and display are generated by the application program.

In step S108, the design is validated by the program receiving the generated conditions and alerts on the external device and display against the inputted design goals. If the design is not validated, the program receives instructions to modify the database (CW Logic) 20 in step S109, and the process is repeated. If the design goals are met, the process moves to the requirements verification phase.

In step S110, the program downloads the CW Bytecode 50 verbatim to the target over the host-target communication interface.

In step S111, the VE 100 is ported from the host via recompilation (source-level compatible).

In step S112, the program receives Sensor Data which represents real-time and/or HWIL-simulated sensor data, and Subsystems Health which represents real-time and/or HWIL-simulated subsystems health information into the VE 120.

In step S113, the CW Bytecode is interpreted by the VE 120.

In step S114, the VE 120 generates the external device and display attributes that drive the actual external device/display unit, typically a multifunctional display unit (MDU).

In step S115, the design is validated by the program receiving the generated conditions and alerts on the external device/display against the inputted design goals. If the design is not validated, the program receives instructions by the user to modify the database (CW Logic) 20 in step S116, and the process is repeated.

If the design goals are met, the program notifies the system architects in step S117, receives acceptance of the design by the user, and the system is ready for deployment.

Thus, the methods and system consistent with the present invention include an architecture (supported by the HMI) that allows a system user or designer to define, test, and validate the data objects for his/her unique system, integrate them with the re-usable VE, and generate CW and system HM application software with minimal need for programming. Once the initial definition and validation is complete, the system can proceed to formal verification, certification, and operation of the application. The VE (code) needs to be verified/certified for the first system only. After that, verification/certification tasks for subsequent configurations of such a system, or other systems that need a CW and system HM application, would be reduced to data (and not code) verification and certification since the VE (code) part would be unchanged, greatly reducing the cost and schedule, and formal verification and certification (typically by more than 500%) of such software products when a certified VE is used for CW and HM systems.

Thus, methods and systems consistent with the present invention automate the generation of embedded software display applications beyond automatic generation of code, and greatly simplify their maintenance. Reduced cycle time allows late requirements changes, and software applications can be prototyped and validated quite early by the actual users or designers of the system, with minimum need for software programmers or any programming, thereby reducing risk.

Further, the present invention can be implemented on different computer platforms (processors), and implemented in different languages (e.g., Ada and C++). Thus, significant reduction in cost and schedule can be achieved during definition, validation, production and maintenance of the CW-HM application software.

The performance of the design architecture is acceptable for CW and system HM application domains, and can be used for rapid development (in a matter of minutes) of embedded software in many systems, including air, ground, and space transportation systems, real-time systems, communication systems, military systems, commercial and industrial systems, ground control, maintenance, and support facilities, and test and simulation facilities, and the like.

One of ordinary skill in the art would know that the above-described embodiments of the invention are merely possible examples of implementations which are set forth for a clear understanding of the principles of the invention. For example, one of ordinary skill in the art would appreciate that methods, systems, and articles of manufacture consistent with the present invention may also be implemented in a client-server environment. A client computer system and server computer system are each connected to a network, such as a Local Area Network, Wide Area Network, or the Internet. Some or all of the code or data can be stored on either the client or the server computer system, and some or all of the steps of the processes can be carried out on the server computer system, which is accessed by the client computer system over the network.

Further, although aspects of one implementation are depicted as being stored in memory, one of ordinary skill in the art would appreciate that all or part of the systems and method consistent with the present invention may be stored on or read from other computer-readable media, such as secondary storage devices, like hard disks, floppy disks, and CD-ROM; a carrier wave received from a network such as the Internet; or other forms of ROM or RAM. Further, one of ordinary skill in the art would appreciate that architecture suitable for use with methods, systems, and articles of manufacture consistent with the present invention may contain additional or different components.

Thus, variations and modifications may be made to the above-described embodiments of the invention without departing from the spirit and principles of the invention. All such modifications and variations are intended to be included herein within the scope of the invention and protected by the following claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method of creating a predetermined application comprising:
   receiving an input of user-defined data objects and attributes of said data objects into a database;
   converting said user-defined data objects and said attributes into a scripting language;
   invoking an object compiler to obtain an intermediate representation of said data objects;
   formatting said intermediate representation and generating a Bytecode that defines components and attributes of the application;
   interpreting said Bytecode using simulated data and subsystems information; and
   at least one of outputting and displaying attributes that drive one of a simulated output device and display.

2. The method of claim 1 further comprising receiving an input of system requirements and domain knowledge prior to said receiving step.

3. The method of claim 1 wherein said database is a caution warning Logic database.

4. The method of claim 1 wherein said formatting step formats said intermediate representation of said data objects to obtain said Bytecode.

5. The method of claim 1 further comprising generating at least one of system Requirements, database statistical Reports and Test Cases in addition to said Bytecode.

6. The method of claim 1 wherein said interpretation step is performed by a Virtual Engine.

7. The method of claim 6 further comprising receiving a determination of a validity of a design of the predetermined application based on said one of outputted and displayed attributes against inputted design goals.

8. The method of claim 7 wherein when said receipt of said determination step is an invalid design, said data objects in said database are modified.

9. The method of claim 1 wherein said steps are performed at a host data processing system.

10. The method of claim 7 further comprising:
    receiving said Bytecode at a target data processing system;
    receiving data and subsystems information into a target Virtual Engine;
    interpreting said Bytecode using said target Virtual Engine; and
    at least one of outputting and displaying attributes that drive at least one of a target output device and display.

11. The method of claim 10 wherein said Bytecode is downloaded to said target data processing system over a communication interface.

12. The method of claim 10 wherein said Virtual Engine is ported to said target data processing system.

13. The method of claim 10 further comprising receiving a determination of a validity of a design of the predetermined application based on said one of outputted and displayed attributes against inputted design goals.

14. The method of claim 13 wherein when said receipt of said determination step is an invalid design, said data objects in said database are modified.

15. The method of claim 10 wherein said Virtual Engine is reusable.

16. The method of claim 1 further comprising providing a human machine interface (HMI) with which to define and validate said data objects and attributes.

17. The method of claim 6 wherein said Virtual Engine is verified/certified for a first application only.

18. The method of claim 16 wherein said HMI is provided on a host data processing system.

19. The method of claim 1 wherein said data objects are defined as at least one of static and dynamic objects.

20. The method of claim 1 wherein said data objects are defined in a specific format and syntax.

21. The method of claim 1 wherein said data objects are menu-driven.

22. The method of claim 1 wherein said data objects maintain a static copy of original attribute data, a dynamic copy, a storage for computational data, and reference to any unique error handling.

23. The method of claim 1 wherein each of said data objects is encapsulated.

24. The method of claim 1 further comprising storing said input of user-defined data objects and attributes in said database.

25. The method of claim 1 wherein said formatting step is performed by a formatter.

26. The method of claim 16 wherein an object compiler is embedded within said HMI.

27. The method of claim 16 wherein said HMI can be one of web-based and on a dedicated PC host.

28. The method of claim 1 wherein said predetermined application is a caution warning (CW) and system health management (HM) application.

29. The method of claim 1 wherein said object compiler maintains a master list of all said data objects and said attributes.

30. The method of claim 5 wherein said generating step is performed by a formatter.

31. The method of claim 30 wherein said formatter uses a domain-specific template and utilizes system-level requirements in generating said Requirements.

32. The method of claim 30 wherein said Requirements are generated in a desired format, including at least one of a commercial word processing program, HTML, and XML.

33. The method of claim 5 wherein said Reports identifies relationships among system variables in said database, to assist in a design of said database including eliminating errors in said database.

34. The method of claim 30 wherein said Test Cases includes a plurality of sets of test vectors generated by said formatter.

35. The method of claim 1 further comprising checking and validating said data objects and said attributes based on said scripting language.

36. The method of claim 35 wherein said scripting language is comprised of distinct sections that include lexical and syntax information.

37. The method of claim 36 wherein said sections include static and dynamic CW and system HM objects.

38. The method of claim 6 wherein said Virtual Engine reads addresses from object definitions for said data objects and attributes linked to external variables, and performs logical and arithmetic operations on said data objects and attributes.

39. The method of claim 1 wherein said interpreting step is performed cyclically to generate desired outputs periodically.

40. The method of claim 1 further comprising interpreting said Bytecode in units of objects selected for interpretation based upon data object internal criteria.

41. The method of claim 1 wherein said data and subsystems information is provided by an I/O Simulation.

42. The method of claim 41 wherein inputs to said I/O Simulation include signal ID, signal type range, enumerated types, internal vs. external signals items, signal values driven by data from at least one of simulation and other applications/sources, and automatic signal threshold selection based on modes of operations.

43. The method of claim 42 wherein outputs of said I/O Simulation include definition of outputs, emergency, warning, caution, advisory messages and driver action text, links with other application objects, auto-clear feature for all outputs, and capability for one of output and display priority attributes.

44. The method of claim 43 wherein outputs of said I/O Simulation are said attributes that drive said at least one of simulated output device and display.

45. The method of claim 7 further comprising generating conditions and alerts on said one of simulated output device and display against said design.

46. The method of claim 7 wherein when said design is valid, a requirements verification phase is initiated.

47. The method of claim 10 wherein when said Bytecode is downloaded to said target data processing system, a requirements verification phase is started.

48. The method of claim 11 wherein said communication interface is one of a serial and Ethernet interface.

49. The method of claim 9 wherein said downloaded Bytecode is a verbatim copy.

50. The method of claim 10 wherein said data and said subsystems information received by said target Virtual Engine is real-time information.

51. The method of claim 1 wherein said display is a multi-functional display unit.

52. The method of claim 10 wherein said one of target output device and display is one of an actual output device and display featuring real-time information.

53. The method of claim 13 wherein when said receipt of said determination step is a valid design, the application is ready for deployment.

54. A method of creating a predetermined application comprising:
receiving an input of user-defined data objects and attributes of said data objects;
storing said data objects and attributes in a database;
converting said user-defined data objects and said attributes into a scripting language;
invoking an object compiler to obtain an intermediate representation of said data objects;
formatting said intermediate representation and generating a Bytecode that defines components and attributes of the predetermined application;
interpreting said Bytecode using a Virtual Engine with simulated data and subsystems information;
at least one of outputting and displaying attributes that drive one of a stimulated output device and display;
receiving a determination of a validity of a design of the predetermined application based on said one of outputted and displayed attributes, and when said design is valid:
receiving said Bytecode at a target data processing system;
receiving real-time data and subsystems information into a target Virtual Engine;
interpreting said Bytecode using said target Virtual Engine; and
at least one of outputting and displaying attributes that drive a target actual one of an output device and display.

55. A method of creating a caution warning (CW) and system health management (HM) application comprising:
receiving an input of user-defined data objects and attributes of said data objects;
storing said data objects and attributes in a database;
converting said user-defined data objects and said attributes into a scripting language;
invoking an object compiler to obtain an intermediate representation of said data objects;
formatting said intermediate representation and generating a Bytecode that defines components and attributes of the predetermined application;
interpreting said Bytecode using a Virtual Engine with simulated sensor data and subsystems health information;
at least one of outputting and displaying attributes that drive one of a stimulated output device and display;
receiving a determination of a validity of a design of the predetermined application based on said one of outputted and displayed attributes, and when said design is valid:
receiving said Bytecode at a target data processing system;
receiving real-time sensor data and subsystems health information into a target Virtual Engine;
interpreting said Bytecode using said target Virtual Engine; and
at least one of outputting and displaying attributes that drive a target real-time one of an output device and display.

56. A system for creating a predetermined application comprising:
a processor component and a memory component;
an interface component configured to receive an input of user-defined data objects and attributes of said data objects into a database and convert said data objects and said attributes into a scripting language;

a compiler component configured to obtain an intermediate representation of said data objects;

a formatter component configured to format said intermediate representation and generating a Bytecode that defines components and attributes of the application;

a simulator component configured to interpret said Bytecode using simulated data and subsystems information; and a presentation component configured to one of output and display attributes that drive one of a simulated output device and display.

57. A system for creating a predetermined application comprising:

a processor component and a memory component;

an interface component configured to receive an input of user-defined data objects and attributes of said data objects and convert said data objects and said attributes into a scripting language;

a storage component configured to store said data objects and attributes in a database;

a compiler component configured to obtain an intermediate representation of said data objects;

a formatter component configured to format said data intermediate representation and generating a Bytecode that defines components and attributes of the predetermined application;

a simulation component configured to interpret said Bytecode using a Virtual Engine with simulated data and subsystems information;

a presentation component configured to one of output and display attributes that drive a simulated one of an output device and display;

a verification component configured to receive a determination of a validity of a design of the predetermined application;

a download component configured to receive said Bytecode at a target data processing system;

a receiver component configured to receive real-time data and subsystems information into a target Virtual Engine;

an interpreter component configured to interpret said Bytecode using said target Virtual Engine; and an output component configured to one of output and display attributes that drive a target actual one of an output device and display.

58. A system of creating a caution warning (CW) and system health management (HM) application comprising:

a processor component and a memory component;

an interface component configured to receive an input of user-defined data objects and attributes of said data objects and convert said data objects and said attributes into a scripting language;

a storage component configured to store said data objects and attributes in a database;

a compiler component configured to obtain an intermediate representation of said data objects;

a formatter component configured to format said intermediate representation and generating a Bytecode that defines components and attributes of the predetermined application;

a simulation component configured to interpret said Bytecode using a Virtual Engine with simulated sensor data and subsystems health information;

a presentation component configured to one of output and display attributes that drive a simulated one of an output device and display;

a verification component configured to receive a determination of a validity of a design of the predetermined application;

a download component configured to receive said Bytecode at a target data processing system;

a receiver component configured to receive real-time sensor data and subsystems health information into a target Virtual Engine;

an interpreter component configured to interpret said Bytecode using said target Virtual Engine; and an output component configured to one of output and display attributes that drive a target real-time one of an output device and display.

59. An apparatus for creating a predetermined application comprising:

a processor component and a memory component;

a human machine interface (HMI) which creates user-defined data objects and attributes of said data objects specific to the application and converts said created object attributes into a scripting language;

a computer-readable storage medium which stores said created data objects and attributes;

an object compiler which obtains an intermediate representation (62) of said data objects;

a formatter which formats said data objects and said attributes into a Bytecode; and an I/O Simulation which provides simulated data and subsystems information to a Virtual Engine which interprets said Bytecode to produce a predetermined functionality and products intended for the application.

60. The apparatus of claim 59 further comprising a target Virtual Engine which interprets a downloaded Bytecode.

61. The apparatus of claim 59 further comprising a database which receives inputs of said created data objects and attributes.

62. The apparatus of claim 61 wherein said database is a caution warning (CW) Logic database.

63. The apparatus of claim 59 further comprising at least one of an output device and display which one of outputs and displays attributes of said interpreted Bytecode.

64. The apparatus of claim 61 wherein said formatter generates at least one of system Requirements, database statistical Reports, and Test Cases, in addition to said Bytecode.

65. The apparatus of claim 61 wherein said database can be modified.

66. The apparatus of claim 59 wherein said HMI, said formatter, said I/O Simulation, and said Virtual Engine are disposed at a host data processing system.

67. The apparatus of claim 63 wherein said at least one of output device and display shows real-time information.

68. The apparatus of claim 67 wherein said real-time information is sensor data and subsystems health information.

69. The apparatus of claim 59 wherein said data and subsystems information is simulated sensor data and subsystems health information.

70. The apparatus of claim 59 wherein the predetermined application is a caution warning (CW) and system health management (HM) application.

71. The apparatus of claim 60 further comprising a communication interface over which said downloaded Bytecode is sent.

72. The apparatus of claim 59 wherein said Virtual Engine is ported to a target processing system.

73. The apparatus of claim 59 wherein said Virtual Engine is reusable.

74. The apparatus of claim 59 wherein said Virtual Engine is verified/certified for a first application only.

75. The apparatus of claim 59 wherein said data objects are defined as at least one of static and dynamic objects.

76. The apparatus of claim 59 wherein said data objects are defined in a specific format and syntax.

77. The apparatus of claim 59 wherein said data objects are menu-driven.

78. The apparatus of claim 59 wherein said data objects maintain a static copy of original attribute data, a dynamic copy, a storage for computational data, and reference to any unique error handling.

79. The apparatus of claim 59 wherein each of said data objects is encapsulated.

80. The apparatus of claim 59 wherein said compiler is embedded within said HMI.

81. The apparatus of claim 59 wherein said HMI can be at one of web-based and hosted on a dedicated PC.

82. The apparatus of claim 59 wherein said object compiler maintains a master list of all said data objects and attributes.

83. The apparatus of claim 64 wherein said formatter uses a domain-specific template and utilizes system-level requirements in generating said Requirements.

84. The apparatus of claim 83 wherein said Requirements are generated in a desired format, including one of a commercial word processing program, HTML, and XML.

85. The apparatus of claim 64 wherein said Reports identify relationships among system variables in said database to assist in a design of said database including eliminating errors in said database.

86. The apparatus of claim 64 wherein said Test Cases include a plurality of sets of test vectors generated by said formatter.

87. The apparatus of claim 59 wherein said data objects and said attributes are checked and validated based on a scripting language.

88. The apparatus of claim 87 wherein said scripting language comprises distinct sections that include lexical and syntax information.

89. The apparatus of claim 88 wherein said sections include static text and dynamic CW and system HM objects.

90. The apparatus of claim 59 wherein said Virtual Engine reads addresses from object definitions for said data objects and attributes linked to external variables, and performs logical and arithmetic operations on said data objects and attributes.

91. The apparatus of claim 59 wherein said Bytecode is interpreted cyclically to generate desired outputs periodically.

92. The apparatus of claim 59 wherein said Bytecode is interpreted in units of objects selected for interpretation based upon data object internal criteria.

93. The apparatus of claim 59 wherein inputs to said I/O Simulation include signal ID, signal type range, enumerated types, internal vs. external signals items, signal values driven by data from simulation and/or other applications/sources, and automatic signal threshold selection based on modes of operations.

94. The apparatus of claim 63 wherein outputs of said I/O Simulation are attributes that drive said one of output device and display.

95. The apparatus of claim 94 wherein said outputs include a definition of outputs, emergency, warning, caution, advisory messages and driver action text, links with other application objects, auto-clear feature for all outputs, and capability for said one of output device and display priority attributes.

96. The apparatus of claim 95 wherein said one of output device and display includes conditions and alerts on said simulated one of output device and display against said design.

97. The apparatus of claim 60 wherein when a design of the application is valid, a requirements verification phase is initiated.

98. The apparatus of claim 60 wherein downloading said Bytecode is a start of a requirements verification phase.

99. The apparatus of claim 98 wherein said Bytecode is downloaded verbatim.

100. The apparatus of claim 71 wherein said communication interface is one of a serial and Ethernet interface.

101. The apparatus of claim 63 wherein said display is a multifunction display unit.

102. The apparatus of claim 60 wherein when a design of the application is valid, the application is ready for deployment.

103. A computer-readable storage medium having contents that cause a computer system to create a predetermined application, the computer system having a program that performs the steps of:
   receiving an input of user-defined data objects and attributes of said data objects into a database;
   converting said user-defined data objects and said attributes into a scripting language;
   invoking an object compiler to obtain an intermediate representation of said data objects;
   formatting said intermediate representation and generating a Bytecode that defines components and attributes of the predetermined application;
   interpreting said Bytecode using simulated sensor data and subsystems health information; and
   at least one of outputting and displaying attributes that drive one of a simulated output device and display.

104. A computer-readable storage medium having contents that cause a computer system to create a predetermined application, the computer system having a program that performs the steps of:
   receiving an input of user-defined data objects and attributes of said data objects;
   storing said data objects and attributes in a database;
   converting said user-defined data objects and said attributes into a scripting language;
   invoking an object compiler to obtain an intermediate representation of said data objects;
   formatting said intermediate representation and generating a Bytecode that defines components and attributes of the application;
   interpreting said Bytecode using a Virtual Engine with simulated data and subsystems information;
   at least one of outputting and displaying attributes that drive a simulated one of output device and display;
   receiving a determination of a validity of a design of the predetermined application based on said one of outputted and displayed attributes, and when said design is valid:
      receiving said Bytecode at a target data processing system;
      receiving real-time data and subsystems information into a target Virtual Engine;

interpreting said Bytecode using said target Virtual Engine; and at least one of outputting and displaying attributes that drive a target actual one of output device and display.

105. A computer-readable storage medium having contents that cause a computer system to create a caution warning (CW) and system health management (HM) application, the computer system having a program that performs the steps of:

receiving an input of user-defined data objects and attributes of said data objects;

storing said data objects and attributes in a database;

converting said user-defined data objects and said attributes into a scripting language;

invoking an object compiler to obtain an intermediate representation of said data objects;

formatting said intermediate representation and generating a Bytecode that defines components and attributes of the predetermined application;

interpreting said Bytecode using a Virtual Engine with simulated sensor data and subsystems health information;

at least one of outputting and displaying attributes that drive a simulated one of output device and display;

receiving a determination of whether a design of the application is valid, and when said design is valid:
  receiving said Bytecode at a target data processing system;
  receiving real-time sensor data and subsystems health information into a target Virtual Engine;
  interpreting said Bytecode using said target Virtual Engine; and
  at least one of outputting and displaying attributes that drive a target real-time one of output device and display.

106. A computer system for creating a predetermined application, the computer system comprising:

a memory including: at least one program for receiving an input of user-defined data objects and attributes of said data objects into a database; converting said user-defined data objects and said attributes into a scripting language; invoking an object compiler to obtain an intermediate representation of said data objects; formatting said intermediate representation and generating a Bytecode that defines components and attributes of the application; interpreting said Bytecode using simulated sensor data and subsystems health information; and at least one of outputting and displaying attributes that drive a simulated one of output device and display; and a processor for running said at least one program.

107. A computer system for creating a predetermined application, the computer system comprising:

a memory including: at least one program for receiving an input of user-defined data objects and attributes of said data objects; storing said data objects and attributes in a database; converting said user-defined data objects and said attributes into a scripting language; invoking an object compiler to obtain an intermediate representation of said data objects; formatting said intermediate representation and generating a Bytecode that defines components and attributes of the application; interpreting said Bytecode using a Virtual Engine with simulated data and subsystems information; at least one of outputting and displaying attributes that drive a simulated one of output device and display; receiving a determination of whether a design of the application is valid, and when said design is valid: receiving said Bytecode at a target data processing system; receiving real-time data and information into a target Virtual Engine; interpreting said Bytecode using said target Virtual Engine; and at least one of outputting and displaying attributes that drive a target actual one of output device and display; and a processor for running said at least one program.

108. A computer system for creating a caution warning (CW) and system health management (HM) application, the computer system comprising:

a memory including: at least one program for receiving an input of user-defined data objects and attributes of said data objects; storing said data objects and attributes in a database; converting said user-defined data objects and said attributes into a scripting language; invoking an object compiler to obtain an intermediate representation of said data objects; formatting said intermediate representation and generating a Bytecode that defines components and attributes of the application; interpreting said Bytecode using a Virtual Engine with simulated sensor data and subsystems health information; at least one of outputting and displaying attributes that drive a simulated one of output device and display; receiving a determination of whether a design of the application is valid, and when said design is valid: receiving said Bytecode at a target data processing system; receiving real-time sensor data and subsystems health information into a target Virtual Engine; interpreting said downloaded Bytecode using said target Virtual Engine; and at least one of outputting and displaying attributes that drive a target real-time one of output and display; and a processor for running said at least one program.

109. The method of claim 33 wherein said Reports generates a difference report between a current version and an updated version to identify system variables in said database.

110. The method of claim 109 wherein a dependency report is generated on changed objects reported in said difference report.

111. The method of claim 110 wherein test cases are automatically generated based on said changed objects only.

112. The method of claim 111, wherein invoking an object compiler to obtain an intermediate representation (IR) of said data objects includes invoking said object complier to automatically run test scripts which then automatically generates said automatic test cases.

113. The apparatus of claim 64 wherein said Reports generates a difference report between a current version and an updated version to identify system variables in said database.

114. The apparatus of claim 113 wherein a dependency report is generated on changed objects reported in said difference report.

115. The apparatus of claim 114 wherein test cases are automatically generated based on said changed objects only.

116. The apparatus of claim 115 further comprising:

an object compiler which obtains an intermediate representation (IR) of said data objects and provides said IR to said formatter to generate said Bytecode;

wherein test scripts are automatically generated by said object compiler which then generates said automatic test cases.

* * * * *